United States Patent Office 3,098,734
Patented July 23, 1963

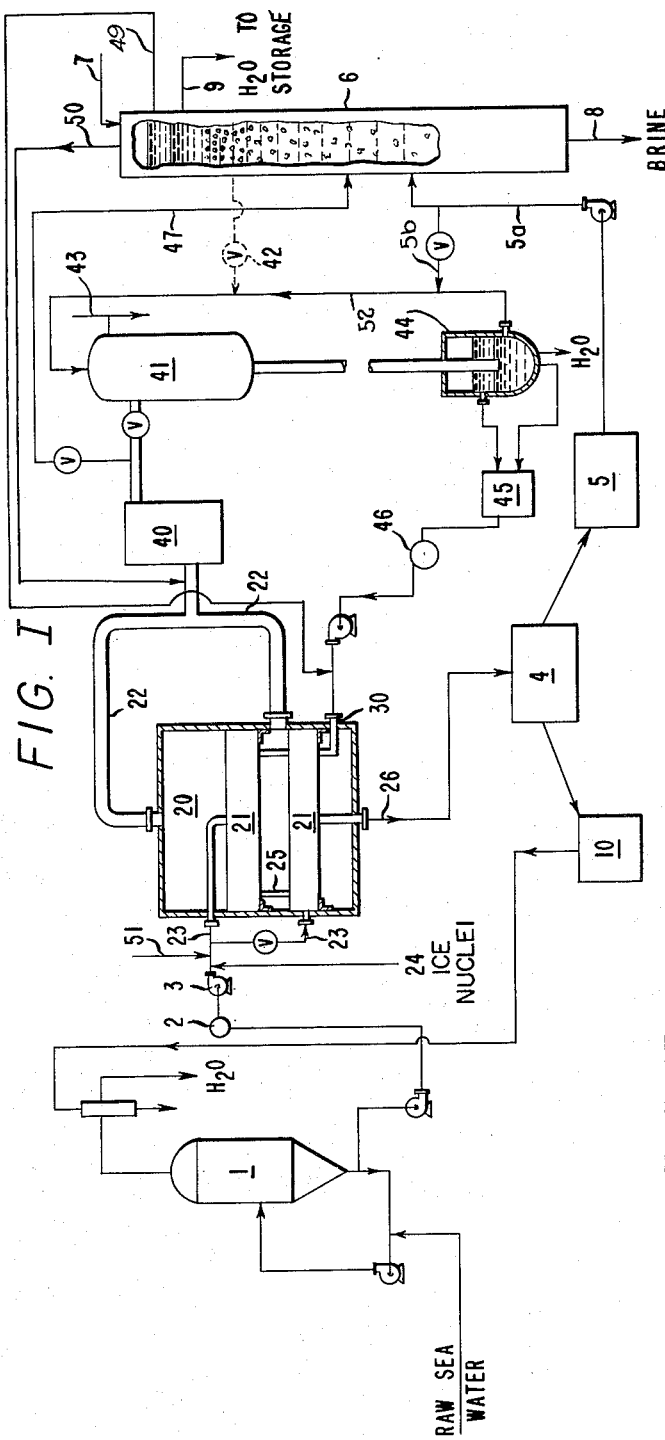

3,098,734
PROCESS FOR THE PREPARATION OF FRESH WATER FROM SEA WATER
Hans Svanoe, Warren, Pa., assignor to Struthers Wells Corporation, Warren, Pa., a corporation of Maryland
Filed Feb. 20, 1959, Ser. No. 794,664
9 Claims. (Cl. 62—58)

This invention relates to a process for the preparation of fresh water from sea water and more particularly to a process for the preparation of fresh water by crystallization of water from the sea by freezing.

Nature has provided a method of producing fresh water from sea water by the simple process of freezing. Fresh formed sea ice, however, has appreciable amounts of non-potable water trapped in the cracks between the tiny ice crystals, and the melted ice while per se potable when melted is contaminated with the retained salt water. While it is true that old polar ice is nearly free from salt it is uneconomical to store large quantities of ice while it purifies itself. Experimenters have shown that ice frozen slowly from agitated sea water can be centrifuged and washed to yield ice which when melted will give water suitable for agricultural purposes and even for drinking by cattle and humans. A number of other methods have been considered to accomplish this most desirable conversion such as by vaporization, solar distillation, chemical precipitation, ion-exchange resins, ion-permeable resin membranes; none of them, however, has been found to be sufficiently low in cost for general use in localities where total cost per gallon must be reasonably low.

In a comprehensive article entitled "Fresh Water from the Sea," Technology Review, vol. 57, No. 1, 15 (1954), Thomas K. Sherwood summarizes cost figures for processes such as are described supra based on power at 0.5 cent per kilowatt-hour, steam at $0.60 per 1,000 pounds, and fixed charges at 15% per year as ranging per 1,000 gallons of potable water from a high of $30.00 for chemical precipitation to a low of $0.75 for freezing.

While it appears from the estimates of T. K. Sherwood that the freezing process is the least expensive, none the less high costs should be reduced to justify the wider spread use of the least expensive process. For potable uses water should contain less than about 100 p.p.m. of salts, sea water containing about 30,000 to 35,000 p.p.m. of salt, brackish water lesser amounts. Water for irrigation generally need not be reduced in salt content to much lower than 1,000 p.p.m. of dissolved salt.

High costs of the present freezing processes are due in no small measure to the difficulties inherent in separating the sea ice from the salt brine mother liquor. Ice formed from sea water does not contain salt, although it invariably is associated when made, by the processes of the art, with occluded or adhering salt solution. The present invention provides a process in which ice crystals are recovered from direct cold exchange refrigerated sea water or brackish water by controlled conditions that provide minimum occlusion and adhering salt liquors.

An object of the present invention is to provide an economical process for the preparation of fresh water from the sea. Another object of the invention is to provide a controlled crystallization process for separating sea ice by direct refrigeration of sea water. Another object is to provide equipment for the separation of crystals from a mother liquor in which the crystals have a lower density than the mother liquor. Yet another object is to provide an over-all process for the preparation of fresh water from the sea involving refrigeration by direct latent heat effects. A still further object is to provide a process in which occluded and adhering salt on sea ice is inhibited by improved crystal habit. Other objects and advantages of the invention will hereinafter appear.

The invention will be more readily understood by reference to the drawings in which like parts have like numbers throughout. FIGURE I illustrates the invention by a flow sheet, and illustrates diagrammatically an evaporator-crystallizer in which water ice is crystallized from sea water while FIGURES IIA and IIIA show diagrammatically details of the trays used in the evaporator-crystallizer. FIGURES IIB and IIIB constitute cross sectional elevations along lines IIb—IIb and IIIb—IIIb of FIGURES IIA and IIIA respectively.

The sea water is subjected to evaporative-crystallization under turbulent flow conditions in evaporator-crystallizer 20 provided with trays 21 in which the water ice crystals are grown. Vapor spaces are provided above the trays 21 from which vapor lines 22 connect said spaces to a compressor, "barometric" condenser or surface condenser or other suitable device not shown to lower the vapor pressure to the desired amount. Sea water feed line 23 and nucleation feed line 24 open into the trays 21. Ice slurry discharge lines 25 and 26 discharge the ice-crystal-sea water mother liquor slurry from the evaporator crystallizer 20.

The evaporator crystallizer 20 may contain a plurality of trays 21 disposed one above the other. FIGURE I contains two trays 21, one as illustrated in FIGURE IIA and B and the other as illustrated in FIGURE IIIA and B. In FIGURE IIA the nucleated sea water is fed through line 23 into the middle section of a spiral or other suitably designed labyrinth, see FIGURE IIB, with baffle wall 27, and a sparger-like floor 28 fed by a manifold 29 and immiscible distillant feed line 30. The FIGURE IIIA tray is similar to the FIGURE IIA tray except with regard to the disposition of the nucleated sea water inlet pipe 23 and the water-ice-mother liquor discharge line 25. In FIGURE IIA the sea water is fed into the central section of the labyrinth and the water-ice-mother liquor slurry discharged from a peripheral section while in FIGURE IIIA the reverse flow is used. The trays may be arranged in the reverse order or any order and any number of trays used, similar or equivalent to those disclosed. Moreover, the flow of sea water into slurry and from the trays 21 may be in series or in parallel i.e., the flow adapted and arranged to pass respectively from line 23 into a topmost tray 21 and from that tray to a lower tray or trays and then from the evaporator-crystallizer or contrarywise from line 23 directly into each tray and then from the evaporator-crystallizer. Combinations of the parallel or series flow through a plurality of trays in the evaporator-crystallizer may be used.

The equipment is operated by passing sea water into precooler 1 from which the seat water cooled by evaporation, under the pressure provided by a suitable reduced pressure system not shown and by heat exchange with the mother liquor, to a temperature of about 8° C. from the sea water normal temperature is passed through cooler 2 in heat exchange with any suitable coolant wherein its temperature is lowered to between plus 3° C. and minus 2° C. To the thus cooled sea water in line 23 ice nuclei are added from line 24 the combined liquor stream is then forced by means of pump 3 into trays 21 at a velocity described below to give a turbulent flow state within the labyrinth. As the sea water passes through the labyrinth channels formed by baffle walls 27 the surface of the turbulent flowing liquor is subjected to a reduced pressure and a latent heat effect whereby a fractional temperature lowering of the sea water is accomplished. If an immiscible organic fluid is used to accomplish the temperature lowering it is introduced through pipe 30 into the manifold 29 of the trays 21. The immiscible organic fluid passes from the lower tray 21 to the upper tray 21 (cf. FIG. I) through the upper extension of pipe 30 which delivers the fluid to chamber 29 of the upper tray as shown in FIGURES IIB and IIIB. The latent heat of evaporation of the immiscible fluid as it lowers the temperature of the nucleated sea water a fraction of a degree C. releases the supersaturation (supercooling the sea water) as crystal growth on water ice nuclei or crystals and the heat of crystallization vaporizes en equivalent amount (in heat values) of organic liquid. By changing the liquor depth on the trays and varying the spacing of the channels, the retention time of the crystal brine slurry is varied from 2 to 20 minutes in the crystallizer 20. The water ice, mother liquor slurry advances through the labyrinth and is discharged from the tray through lines 25 and 26 and is charged into a filter or other separating device 4.

The ice separated from the mother liquor is sent to slurry tank 5 and from this tank the slurry is sent to the suspension fluidization tower 6 wherein the adhering mother liquor on the ice is separated. In tower 6 the ice passes up the tower against the countercurrent flow of cold water passing down the tower, the cold-water being fed into the tower 6 through line 7 or alternatively being supplied by melting the ice. The salt containing mother liquor entering the tower through line 5a with the ice is discharged from tower 6 with the water from line 7 or supplied by melting the ice, through the discharge line 8.

An alternate feature of the process includes utilization of the heat capacity of the compressed immiscible fluid to scour the brine from the ice while at one and the same time the ice cools and/or condenses the immiscible fluid. When operating the process in this manner an immiscible fluid is used which has a density less than water, examples of such fluids are the condensable alkanes described below e.g. propane, butane, iso-butane or mixtures thereof. After compression in compressor 40 the heated and compressed fluid is fed by line 47 to tower 6. The compressed fluid is preferably introduced into the tower below the normal liquid-ice margin. The fluid being lighter than the brine, the water or the ice rises rapidly up the tower, during which it performs three functions. First it scours the brine from the surfaces of the ice crystals. Second it becomes condensed to a liquid by surface contact with the ice. And third as the thus condensed immiscible liquid rises up the tower the liquid carries the water melted from the ice up the tower. At the top of the tower the condensed immiscible fluid separates as a supernatant layer on a lower layer of water. The condensed alkane for example is discharged from tower 6 through line 49 and returned to line 30 for reuse. Any uncondensed alkane is discharged through line 50 compressed and returned to the system. The intermediate layer which is water and/or water-ice slurry is discharged from the tower and sent to storage.

Operation of the invention in accord with the last described feature provides an additional economical means of separating the brine from the ice. Due to its low density 0.92 the ice crystals crowd to the top of the tower and due to higher density the brine say a 24° F. brine (density 1.05) flows to the bottom of the tower. The water, with its intermediate density 1.00, also tends to flow up the tower and is lifted as it is melted from the ice surfaces by the alkane which has a relatively faster upward flow. As a consequence of these density differences, differential flow velocities and initially the vapor phase state of the alkane with very high upflow velocity, a thorough and effective scrubbing of the ice is accomplished.

Moreover, in the above countercurrent flow operation additional lowering of the p.p.m. salt content of the water produced can be accomplished by increasing the brine discharge rate. This will tend to cause some of the water dissolved by the alkane to flow countercurrent to the flow of ice, commingle with the brine and be discharged with the brine.

The immiscible fluid by the above or other suitable means is compressed, cooled, condensed and then returned to the trays 21 at approximately the temperature of crystallization and preferably no more than about 2 to 5 degrees centigrade above crystallization temperature. The sea water entering the system is precooled in cooler 1 by evaporation under reduced pressure provided by reduced pressure system and heat exchange of the mother liquor from tank 10. The condensate from the evaporative cooling of the sea water can be used later in the process or sent directly to the water storage.

In the drawing the immiscible fluid is introduced into the trays through the spargers 28. Other methods of introducing the fluid may be used, however. For example the fluid can be added to the nucleated sea water through line 51, sprayed on top of the turbulent sea water flowing in the labyrinth of the tray or added by any other suitable method. Control of crystallization temperature is improved by a supernatant fluid on the crystallizing brine. The crystals will transmit sensible and latent heat to an alkane film, for example, such as iso-butane, thereby causing a very uniform evaporation of the alkane which in turn will maintain a uniform delta T between the crystals and the brine. A uniform driving force and a uniform crystal growth is thus obtained.

It goes without saying the economical utilization of heat is a prerequisite to an efficient process. The heat control of the liquid slurry should consequently be employed to the fullest extent. The latent heat of melting the ice for example is used to maintain the condensing medium from the evaporator-crystallizer 20 at about 0° C. The vapors leaving said crystallizer are at about minus 3° C. and equivalent to a guage vapor pressure of 5 to 10 lbs. per square inch. Compression of that vapor, in a centrifugal compressor to a temperature of 2 to 3° C. at a pressure between 10 to 25 lbs. per square inch guage is recommended using the liquor slurry to accomplish the cooling. A preferred method of accomplishing this result is by direct contact of the slurry with the vapor in the condenser 41.

This feature of the process is operated by compressing vapors, at a temperature of about minus 3° C. and a pressure between 5 to 15 lbs. per square inch guage, from the evaporator-crystallizer 20 in compressor 40. Heat of compression is withdrawn from the compressed vapors in the barometric condenser 41 in which the compressed vapors meet slurry from line 52. Sufficient slurry to accomplish the liquification of the liquifiable vapors from the evaporator-crystallizer 20 is pumped from line 26 through device 4, slurry tank 5, lines 5a and 5b into line 52, uncondensable vapors being removed by injector 43. The condensed vapors are collected in vessel 44 passed to receiver 45, the organic refrigerant being subjected in cooler 46 to the temperature for refrigeration in the evaporator-crystallizer 20 and then introduced into manifolds 29 of the separate trays 21. Brine-free slurry from the tower 6 may be used to condense the immiscible fluid in condenser 41 to produce fresh water and condensed fluid.

To insure effective operation of the process the flow rate of the freezing sea water should be sufficient to maintain a turbulent state in the labyrinth of the trays 21. The turbulence should be such that the crystals tumble through the slurry, as the crystals are growing, from entrance to exit of the trays. The tumbling action should be so thorough that no part of the tray contains a quiescent zone wherein crystals can form into aggregates or crystals deposit on any surface of the tray or lines leading to or from the trays. Baffles, undulating labyrinth walls not shown in the drawing or any suitable means may be used to deflect the flow from straight line to turbulent flow and to assist in establishing and maintaining the turbulent state.

Turbulence in the trays is also supported by the flow rate of nucleated sea water through line 23 into the passages 31 confined by wall 27. The rate of flow through the channels formed by baffles 27 can vary through wide limits and range between 2.5 to 10 feet per second and preferably between 3 to 7 feet per second.

An important feature of the invention emanated from the realization that rate of the crystallization of water from sea water is very high. Extensive actual and theoretical studies have been made on the rate of crystal formation from super-saturated solutions of organic and inorganic salts. The rate with which water crystals form, under proper conditions, has been found to be of an entirely different magnitude (and is in the order of 100 times) than the rate of salt crystallization from super-saturated solutions. This high rate of crystallization distinguishes crystal growth of ice from crystal growth of salts generally.

Successful production of potable water from sea water requires the separation of adhering and occluded salt containing mother liquor from the ice crystals. Production of ice with the proper crystal habit is a prerequisite to maximum separation. In order to obtain proper crystal habit, and also proper rate of crystallization, the sea water temperature should be closely controlled within a fraction of 1° C. and preferably with a 0.1° C. maximum deviation from the temperature of the ice crystals. Such a small deviation should occur within the operating temperature range between minus 1.5° C. and minus 10° C., preferably between minus 4° C. and minus 8° C. Within this temperature range the sea water will become slightly supercooled, (supersaturated) with respect to ice. By controlling the rate of evaporation, and by having ice crystals present the small degree of supersaturation is quickly released to grow crystals having a minimum of adhering and/or occluded mother liquor (i.e., the liquor remaining after crystallizing out the water ice).

Control of the temperature differential between the crystals and the liquor in which it is suspended is a critical feature of the invention. A small temperature differential, applicant has found, insures a crystal form that sheds the maximum amount of sea water brine. Water, of course, can be crystallized in the beautiful habit of snow. Snow crystals would occlude sea water brine in such amounts that separation would be economically impossible. By restricting the temperature differential between the growing crystal and the sea water liquor to a minimum, dense, compact crystals relatively free from whiskers and trees are formed. Sea water brine can be readily separated from such crystals with on the one hand little or no occlusion of sea water brine and on the other little or no substantial solution of the crystals during a washing operation.

Moreover, the minimum temperature differential is not realized unless the heat of crystal growth is rapidly removed from the crystallizing liquor. As the ice grows on the nuclei present in the solution the heat of crystallization tends to maximize the temperature differential. By removal of this heat as formed and maintaining the minimum temperature differential crystals practically free from whiskers, trees etc. that occlude the sea water brine are produced.

Any suitable fluid having a relatively high latent heat of evaporation in crystallizing ice from sea water under the temperature and pressure of the process of the invention may be used. The preferred fluids are liquids at absolute pressures above 300 mm. of Hg at the temperatures of crystallization of the invention, and are substantially immiscible in the sea water i.e. have a solubility of less than about 0.5 gr./100 grs. of water. Examples of suitable fluids for this purpose are the halogenated hydrocarbons such as the fluorinated hydrocarbon refrigrants e.g. trichloromonofluoromethane, dichlorodifluoromethane, monochlorotrifluoromethane, monobromotrifluoromethane, trichlorotrifluoroethane, dichlorotetrafluoroethane etc. The low boiling saturated hydrocarbons may be used such as normal and iso-propane, normal and iso-butane and the higher molecular weight hydrocarbons.

In accordance with the preferred embodiment of the invention the latent heat of evaporation of the above described organic fluids is used to grow the crystals in the nucleated sea water. Other means of effecting the crystal growth by heat removal from the nucleated sea water may be employed such for example as by simple evaporation under reduced pressure with or without sparging a suitable fluid distillation medium into the turbulent slurry as it flows through the labyrinths of the trays 21. When operating with water alone as the evaporating and heat removing medium pressures of 5 mm. or below are employed in the evaporator-crystallizer 20.

An important feature of the process is the addition of seed crystals of predetermined size and shape to the evaporator-crystallization vessel 20. Nucleating or seeding, is accomplished by passing finely divided fresh water ice crystals, crushed fresh water ice or any other suitable fresh water ice crystals, through line 24 immediately prior to passing the sea water feed into the trays 21. To produce such nuclei, a certain quantity of sea water can also be passed through an outside evaporator zone, thereby producing nuclei say in amounts less than 5% of the total ice formed. Nucleation also assists in controlling crystal habit so that within the period of time between the addition of fresh ice crystals to the sea water and the discharge of the slurry of sea water mother liquor and fresh water crystals from trays 21 acceptable crystals will form and grow on the nuclei added or formed because of the nuclei present. The speed of crystal propagation in sea water is indicative of the precision of control that should be used not only to insure that crystallization occurs within the space of time the sea water is in the crystallizer-evaporator 20 but also to insure that the crystal habit has time to be established.

The heat balance is adjusted and arranged with residence time in the evaporator-crystallizer 20 to provide in the product leaving the crystallizer a slurry containing from 15 to about 40% ice and preferably between 20 and 30% ice by weight. With an ice yield of about 20% by weight the temperature of the nucleated sea water entering the crystallizer will be about 0.5° C. higher than the temperature of the slurry leaving the crystallizer. This delta T is evenly distributed over the residence time that the crystallizing sea water is in the crystallizer the residence time determining, inter alia, the yield of ice. The residence time, moreover, varies according to the evaporative effect. It is preferably held between 2 to 20 minutes although considerably shorter or longer residence time commensurate with maintaining the turbulent flow state and the preferred delta T may be employed.

Many changes may be made in the process and apparatus of the invention within the purview of the appended claims without departing from the scope of the application as filed or departing from the invention.

I claim:

1. In a process for the preparation of potable water from sea water the steps which comprise nucleating sea water, subjecting the nucleated sea water liquor to crystallization by the latent heat of evaporation of a substantially water immiscible organic fluid at a temperature between minus 1.5° C. and minus 10° C. conducting substantially all of the nucleation and crystallization of the sea water to discrete ice crystals while the sea water is in a slurry of ice crystals and in direct heat exchange contact with the evaporating organic refrigerant, the endothermicity of the evaporating refrigerant being sufficient to propogate the formation of ice and the growth of ice crystals on the crystals present and also sufficient to avoid the establishment of an equilibrium state between the ice and the saline water and sufficient to avoid the reversion of the ice to water in the suspension and maintaining the temperature of the sea water liquor within a fraction of a degree Centigrade of the temperature of the ice crystals, thereby rapidly crystallizing fresh water crystals from the sea water.

2. In a process for the removal of salts from sea water to produce fresh water, containing less than about 1,000 p.p.m. of dissolved salt, suitable for irrigation and potable uses the steps which comprise cooling sea water to a temperature between plus 3° C. and minus 2° C. adding ice nuclei thereto, subjecting the nucleated sea water liquor to a temperature differential of less than 0.1° C. between crystals and liquor and to the latent heat of evaporation of an immiscible organic fluid in contact with the nucleating sea water sufficient to grow fresh water ice from the nuclei conducting substantially all of the nucleation and crystallization of the sea water to discrete ice crystals while the sea water is in a slurry of ice crystals and in direct heat exchange contact with the evaporating organic refrigerant, the endothermicity of the evaporating refrigerant being sufficient to propogate the formation of ice and the growth of ice crystals on the crystals present and also sufficient to avoid the establishment of an equilibrium state between the ice and the saline water and sufficient to avoid the reversion of the ice to water in the suspension.

3. The process of claim 2 in which the crystallization of the sea water is conducted while under a turbulent flow state.

4. The process of claim 3 in which the relatively immiscible fluid is normally a liquid at a pressure above 300 mm. Hg absolute and is soluble in the sea water to the extent of less than 1,000 p.p.m.

5. The process of claim 4 in which the nucleated sea water is in a turbulent flow state from 2 to 20 minutes.

6. An evaporator-crystallizer of the class described comprising a structure enclosing a plurality of trays disposed one above the other and separated by a space of sufficient volume to permit the evaporation of vapors from a liquid flowing in said trays, said trays containing labyrinthine passages open to said spaces, conduits for transportation of fluids to be crystallized to and from said trays, means for dispersing an organic liquid refrigerant that is substantially immiscible with water into the crystallizing fluids during the latter's passage through said trays, and means for reducing the pressure on the vapors in said spaces.

7. In a process for the conversion of saline water to fresh water containing less than 1,000 p.p.m. of dissolved salt and suitable for irrigation and potable uses, the steps which comprise:
  (a) cooling saline water,
  (b) adding nuclei to the sea water,
  (c) passing the cooled saline water into a slurry of ice crystals in saline water mother liquor at a temperature below the freezing point of the mother liquor,
  (d) producing a turbulent state in the slurry,
  (e) subjecting the resulting turbulent slurry to direct heat exchange contact with the latent heat of evaporation of an organic refrigerant,
  (f) crystallizing, and growing discrete ice crystals on the added nuclei while the saline water is in direct heat exchange contact with the evaporating refrigerant, the endothermicity of the evaporation being sufficient to propagate the formation of the ice and the growth of ice on the crystals present and also sufficient to avoid the establishment of an equilibrium state between the ice and the saline water and sufficient to prevent the reversion of the ice to water, in the suspension,
  (g) and separating the ice crystals from the mother liquor.

8. The process of claim 7 in which the temperature difference between the mother liquor and ice crystals in the turbulent slurry of step (c) is within a fraction of a degree C.

9. The process of claim 7 in which the nucleation crystallization, and crystal growth of step (f) is conducted at a temperature of between minus 1.5° C. and minus 10° C.

References Cited in the file of this patent

UNITED STATES PATENTS

| 2,315,762 | Ax et al. | Apr. 6, 1943 |
| 2,764,488 | Slattery | Sept. 25, 1956 |
| 2,821,304 | Zarchin | Jan. 28, 1958 |
| 2,896,419 | Thompson | July 28, 1959 |
| 2,904,511 | Donath | Sept. 15, 1959 |

FOREIGN PATENTS

| 70,507 | Norway | June 3, 1946 |
| 217,766 | Australia | Oct. 16, 1958 |